United States Patent
Dowaki et al.

(10) Patent No.: US 9,467,631 B2
(45) Date of Patent: Oct. 11, 2016

(54) RADIATION IMAGING APPARATUS, METHOD OF DRIVING THE SAME, AND RADIATION INSPECTION APPARATUS

(71) Applicant: CANON KABUSHIKI KAISHA, Tokyo (JP)

(72) Inventors: Kanako Dowaki, Tokyo (JP); Kazumasa Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 14/669,182

(22) Filed: Mar. 26, 2015

(65) Prior Publication Data
US 2015/0296151 A1 Oct. 15, 2015

(30) Foreign Application Priority Data
Apr. 14, 2014 (JP) .................................. 2014-083094

(51) Int. Cl.
*G01T 1/24* (2006.01)
*H04N 5/343* (2011.01)
*H04N 5/351* (2011.01)
*H04N 5/376* (2011.01)
*H04N 5/378* (2011.01)

(52) U.S. Cl.
CPC .............. *H04N 5/343* (2013.01); *H04N 5/351* (2013.01); *H04N 5/378* (2013.01); *H04N 5/3765* (2013.01)

(58) Field of Classification Search
CPC ......... G01T 1/24; G01T 1/2928; H04N 5/32; H01L 27/14676; G03B 42/04
See application file for complete search history.

(56) References Cited

U.S. PATENT DOCUMENTS

| | | | |
|---|---|---|---|
| 8,785,870 B2 | 7/2014 | Matsumoto et al. | |
| 8,988,572 B2 | 3/2015 | Dowaki et al. | |
| 2012/0075515 A1 | 3/2012 | Dowaki et al. | ............... 348/311 |
| 2012/0104267 A1* | 5/2012 | Matsumoto | .............. H04N 5/33 250/370.08 |
| 2014/0036118 A1 | 2/2014 | Dowaki et al. | |
| 2014/0037056 A1 | 2/2014 | Naito et al. | |
| 2015/0204988 A1 | 7/2015 | Dowaki | |

FOREIGN PATENT DOCUMENTS

| | | |
|---|---|---|
| JP | 2002-344809 | 11/2002 |
| JP | 2012-074864 | 4/2012 |
| JP | 2012-099910 | 5/2012 |

* cited by examiner

*Primary Examiner* — David Porta
*Assistant Examiner* — Mamadou Faye
(74) *Attorney, Agent, or Firm* — Fitzpatrick, Cella, Harper & Scinto

(57) ABSTRACT

A radiation imaging apparatus comprising a sensor and a driving unit, the sensor including a detection element and a holding unit, wherein the driving unit drives the sensor so as to perform a first operation of making a first sampling unit sample a first signal corresponding to a voltage of the holding unit which has changed in accordance with a dose of radiation detected by the detection element after the holding unit holds a voltage corresponding to a signal from the detection element when a first reset unit resets the detection element, and a second operation, after the first operation, of making the first reset unit reset the detection element after a second sampling unit samples a second signal corresponding to a voltage of the reset holding unit while a second reset unit resets the holding unit.

10 Claims, 14 Drawing Sheets

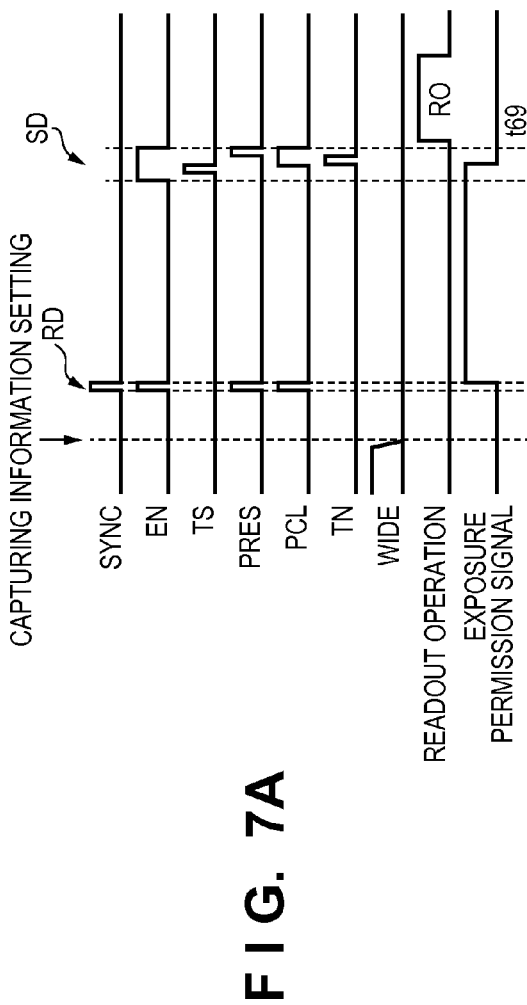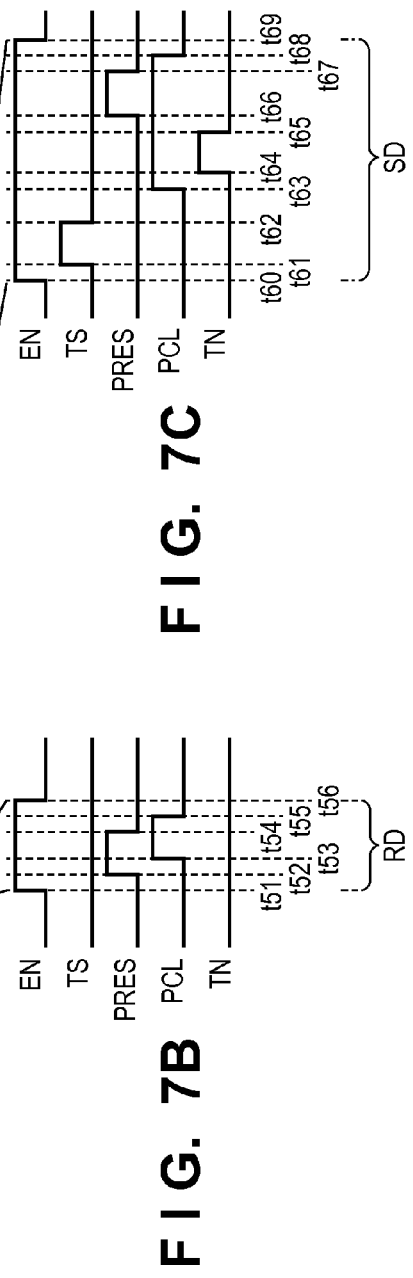

RADIATION IMAGING APPARATUS, METHOD OF DRIVING THE SAME, AND RADIATION INSPECTION APPARATUS

BACKGROUND OF THE INVENTION

1. Field of the Invention

The present invention relates to a radiation imaging apparatus, a method of driving the same, and a radiation inspection apparatus.

2. Description of the Related Art

A radiation imaging apparatus (to be simply referred to as an "imaging apparatus" hereinafter) includes a plurality of sensors, and obtains image data representing the internal information of an object based on the radiation passing through the object and detected by a plurality of sensors.

Japanese Patent Laid-Open No. 2002-344809 discloses an example of the arrangement of sensors. Each sensor shown in FIG. 10 in Japanese Patent Laid-Open No. 2002-344809 includes a detection element which detects radiation, a first reset unit which resets the detection element, a clamp unit which clamps a signal from the detection element when it is reset by the first reset unit, and a second reset unit which resets the clamp unit. This sensor also includes a first sampling unit which samples, as an optical signal (S signal), the voltage of the clamp unit which has received a signal from the detection element which has detected radiation after it is reset by the first reset unit. The sensor further includes a second sampling unit which samples, as a noise signal (N signal), the voltage of the clamp unit when it is reset by the second reset unit.

This arrangement makes it possible to remove fixed pattern noise caused by the sensor arrangement or the like while removing kTC noise caused by heat or the like from the signal obtained by a sensor.

When performing movie image capturing, the imaging apparatus can obtain a plurality of image data by repeatedly reading out signals from a plurality of sensors, and output the plurality of image data to a display or the like in the order in which they were obtained. The time required to obtain one image data by performing signal readout from a plurality of sensors once is also called a frame rate.

Movie image capturing requires a technique of changing (greatly or slightly) the frame rate while performing capturing in accordance with the observation target region of an object, the observation method or the like to be used, and the purpose. For example, increasing the frame rate makes it possible to smoothly play back a movie image because a plurality of image data are obtained at short intervals. Decreasing the frame rate makes it possible to improve the sensor sensitivity because it is possible to increase the accumulation time of charges in each detection element. For example, the frame rate may be increased when observing the movement of an observation target region, and may be decreased when observing an affected area of the region in detail.

SUMMARY OF THE INVENTION

The present invention provides a technique advantageous in performing radiation capturing while changing the frame rate.

One of the aspects of the present invention provides a radiation imaging apparatus comprising a sensor and a driving unit configured to drive the sensor, the sensor including a detection element configured to detect radiation, a first reset unit configured to reset the detection element, a holding unit configured to hold a voltage corresponding to a signal from the detection element, a second reset unit configured to reset the holding unit, a first sampling unit configured to sample a signal corresponding to a voltage of the holding unit, and a second sampling unit configured to sample a signal corresponding to the voltage of the holding unit, wherein the driving unit drives the sensor so as to repeatedly perform a first operation of making the first sampling unit sample a first signal corresponding to a voltage of the holding unit which has changed in accordance with a dose of radiation detected by the detection element after the holding unit holds a voltage corresponding to a signal from the detection element when the first reset unit resets the detection element, and a second operation of making the first reset unit reset the detection element after the second sampling unit samples a second signal corresponding to a voltage of the reset holding unit, after the first operation, while the second reset unit resets the holding unit, and the driving unit further drives the sensor, in a first mode in which an interval from an end of the given second operation to a start of the next first operation is a first interval, so as to execute a third operation of making the first reset unit reset the detection element and making the second reset unit reset the holding unit in the interval, while the second operation also functions as the third operation in a second mode in which an interval from an end of the given second operation to a start of the next first operation is a second interval shorter than the first interval.

Further features of the present invention will become apparent from the following description of exemplary embodiments with reference to the attached drawings.

BRIEF DESCRIPTION OF THE DRAWINGS

FIGS. 7A to 7C are timing charts each for explaining an example of driving a sensor;

DESCRIPTION OF THE EMBODIMENTS

1. Example of Arrangement of Radiation Imaging Apparatus

Figure 1:
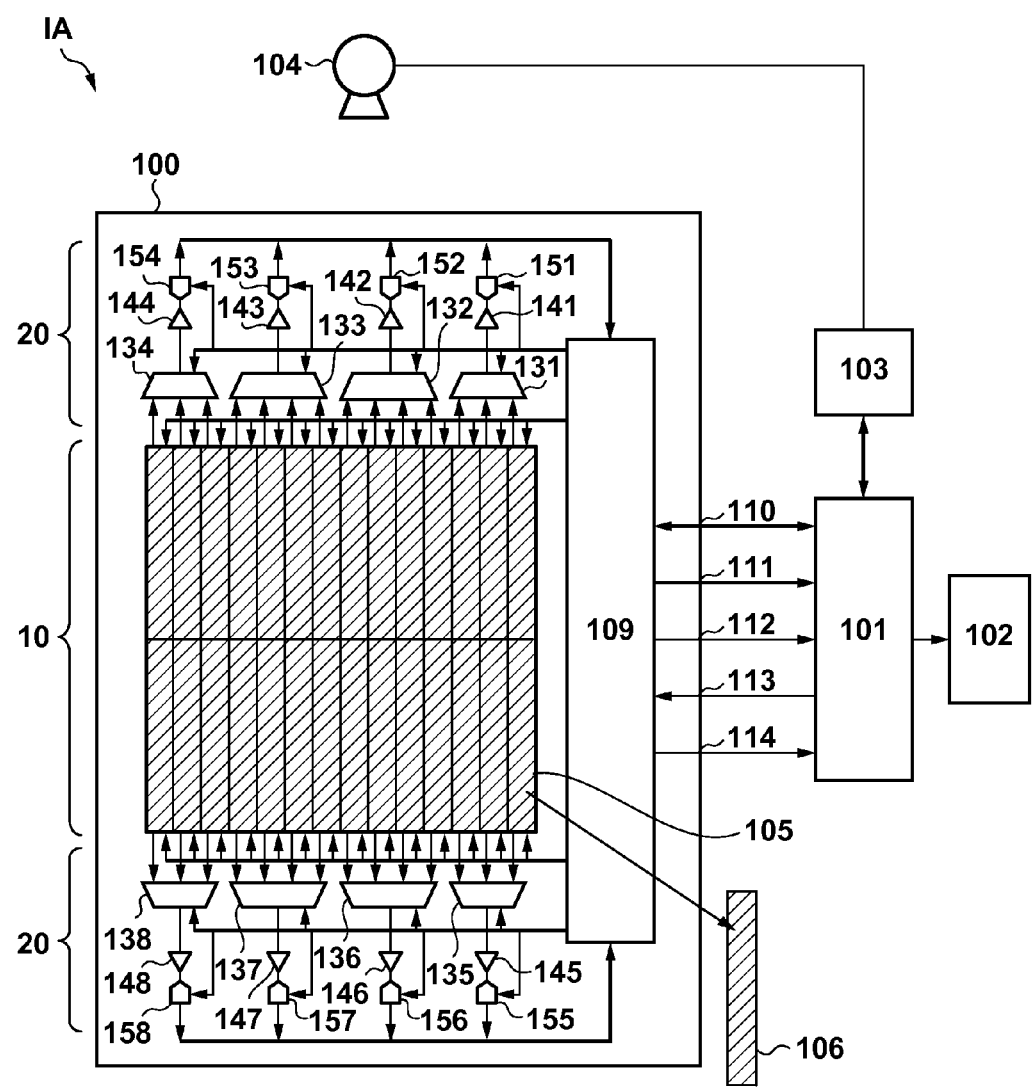
FIG. 1 is a view for explaining an example of the system configuration of a radiation inspection apparatus.

FIG. 1 is a system block diagram showing an example of the overall arrangement of a radiation inspection apparatus IA (to be referred to as an "inspection apparatus IA" hereinafter) typified by a radiation imaging system. The inspection apparatus IA includes a radiation imaging apparatus 100 (to be referred to as an "imaging apparatus 100" hereinafter), a processing unit 101, a display unit 102, a radiation source control unit 103, and a radiation source 104.

The imaging apparatus 100 obtains image data representing the internal information of an object by radiation capturing, and outputs the image data to the processing unit 101. The processing unit 101 processes the image data. In addition, the processing unit 101 can function as a system control unit which exchanges control signals with each unit, and performs system control on the overall inspection apparatus IA. The display unit 102 includes, for example, a display, and displays a radiation image upon receiving image data from the processing unit 101.

When performing radiation capturing, the processing unit 101 controls the radiation source control unit 103 synchronously with the imaging apparatus 100. The radiation source control unit 103 outputs a control signal to the radiation source 104 based on a control signal from the processing unit 101. In response to a control signal from the radiation source control unit 103, the radiation source 104 generates radiation (X-rays, $\alpha$-rays, $\beta$-rays, $\gamma$-rays, or the like).

The imaging apparatus 100 includes an imaging unit 10, a readout unit 20 which reads out a signal from the imaging unit 10, and a control unit 109 which controls each unit in the imaging apparatus 100 while exchanging signals with the processing unit 101.

The imaging unit 10 includes a sensor panel 105 (or sensor array). The sensor panel 105 is formed by arraying a plurality of sensor units 106. Each sensor unit 106 is, for example, a sensor chip manufactured by a known semiconductor manufacturing process using a silicon wafer. Each sensor unit 106 has a plurality of sensors arrayed to form a plurality of rows and a plurality of columns. The adjacent sensor units 106 may be physically separated by dicing or may not be separated. For example, it is possible to inspect each sensor unit 106 before dicing and selectively use the sensor units 106, the inspection results of which satisfy a predetermined criterion.

For the sake of descriptive convenience, an arrangement is exemplified, in which the sensor units 106 are arrayed to form 2 rows×14 columns. However, the arrangement of the imaging unit 10 is not limited to this number of sensor units 106.

A scintillator (not shown) which converts, for example, radiation into light is provided on the imaging unit 10. The imaging unit 10 obtains image data based on light from the scintillator. In this case, a so-called indirect conversion type arrangement has been exemplified, which converts radiation into light by using the scintillator and photoelectrically converts the light. However, it is possible to use a so-called direct conversion type arrangement which converts (directly) radiation into an electrical signal.

The readout unit 20 includes, for example, multiplexers 131 to 138, signal amplifying units 141 to 148 including differential amplifiers and the like, and A/D conversion units 151 to 158 which perform analog-to-digital conversion (A/D conversion). The multiplexer 131 or the like forms a column selection unit which selects sensors as signal readout targets for each column. The signal amplifying unit 141 or the like and the A/D conversion unit 151 or the like form an output unit which outputs signals from the sensors on the selected column.

A plurality of electrodes for exchanging signals or supplying power are arrayed on the upper and lower side portions of the imaging unit 10. Each electrode is connected to an external circuit via a flying lead type printed wiring board (not shown). For example, the readout unit 20 reads out signals from the imaging unit 10 via electrodes. In addition, the control unit 109 supplies control signals to the imaging unit 10 via electrodes.

The control unit 109 exchanges control signals with the processing unit 101 via various types of interfaces, and outputs image data to the processing unit 101. A control interface 110 is an interface for exchanging setting information such as operation modes and various types of parameters, capturing information, and apparatus information such as the operation state of the imaging apparatus 100. An image data interface 111 is an interface for outputting the image data obtained by the imaging apparatus 100 to the processing unit 101.

In addition, the control unit 109 notifies the processing unit 101, via a READY signal 112, that the imaging apparatus 100 is ready for capturing. The processing unit 101 notifies the control unit 109, via an external synchronization signal 113, of the timing of the start of radiation irradiation (exposure) in response to the READY signal 112 from the control unit 109. The control unit 109 outputs a control signal to the radiation source control unit 103 to make it start radiation irradiation while an exposure permission signal 114 is in the enable state.

With the above arrangement, the control unit 109 exchanges control signals and synchronization signals with the processing unit 101, and performs drive control and operation mode control with respect to the imaging unit 10 and other units. The control unit 109 combines image data (digital data) from the respective sensor units 106, which are A/D-converted by the A/D conversion units 151 and the like of the readout unit 20, into one frame data, and outputs it to the processing unit 101.

Figure 2:
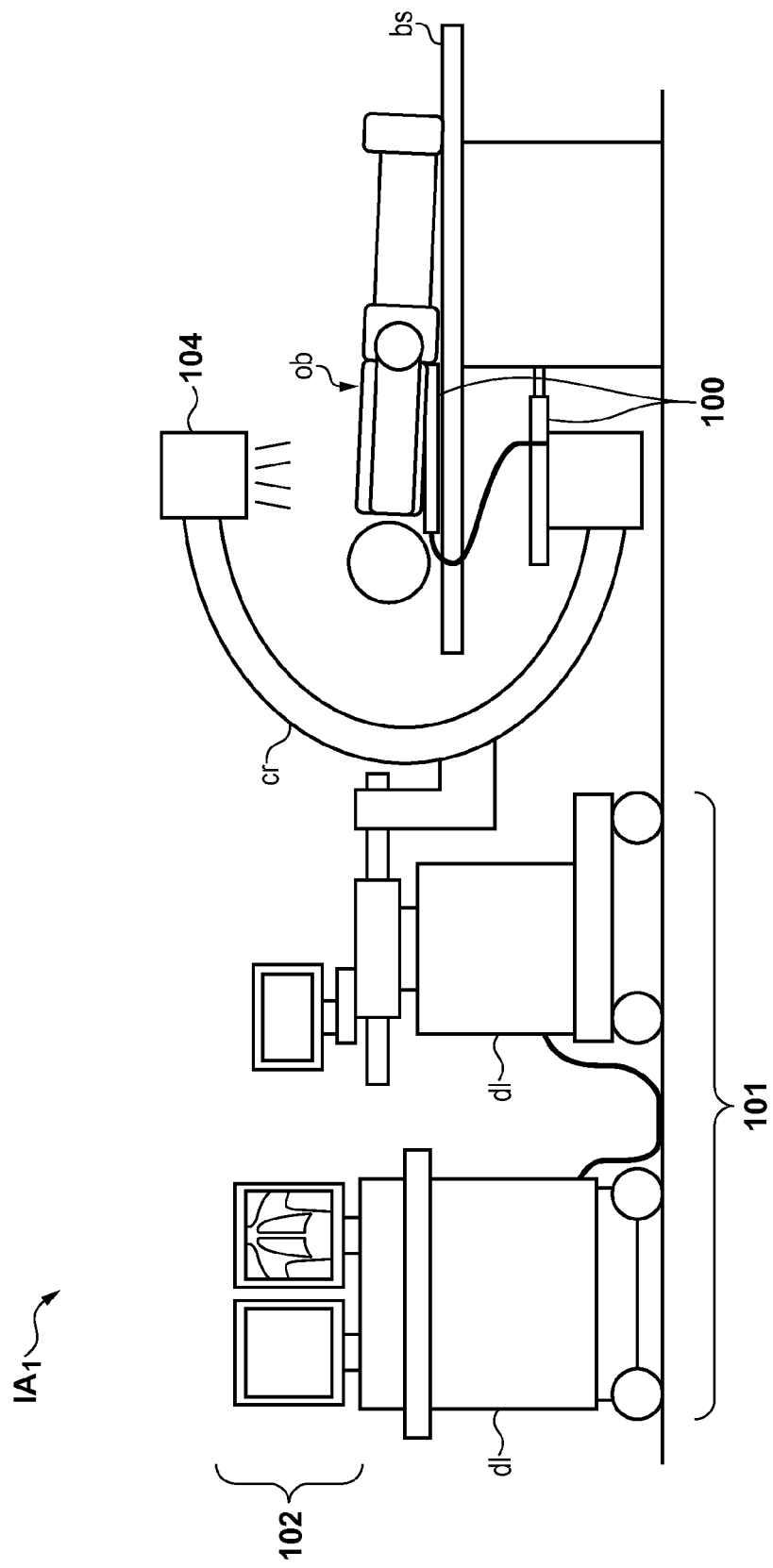
FIG. 2 is a view for explaining a specific arrangement example of a radiation inspection apparatus.

FIG. 2 is a schematic view showing an example of the arrangement of a C-arm type radiation fluoroscopic examination apparatus $IA_1$ (to be referred to as an "examination apparatus $IA_1$" hereinafter) as an example of the inspection apparatus IA. In this arrangement, the respective units such as the processing unit 101 are mounted on a cart dl. This allows the user to move the examination apparatus $IA_1$. The user then performs radiation capturing with respect to an object ob placed on a bed bs. The examination apparatus $IA_1$ can perform both still image capturing and movie image capturing.

The imaging apparatus 100 and the radiation source 104 are fixed by a C-arm cr. The imaging apparatus 100 may be designed to be detachable from the C-arm cr. The detached imaging apparatus 100 can also be used for another inspection apparatus.

In addition, the processing unit 101 may include a communication unit for transferring image data to a remote place, such as a wireless LAN. This makes it possible to transfer the image data to the user in a remote place. In addition, the processing unit 101 may include a data saving unit for saving image data, such as an optical disk. This makes it possible to display the radiation image based on the image data on the display unit 102 at another time.

2. Example of Arrangement of Sensor Unit

Figure 3:
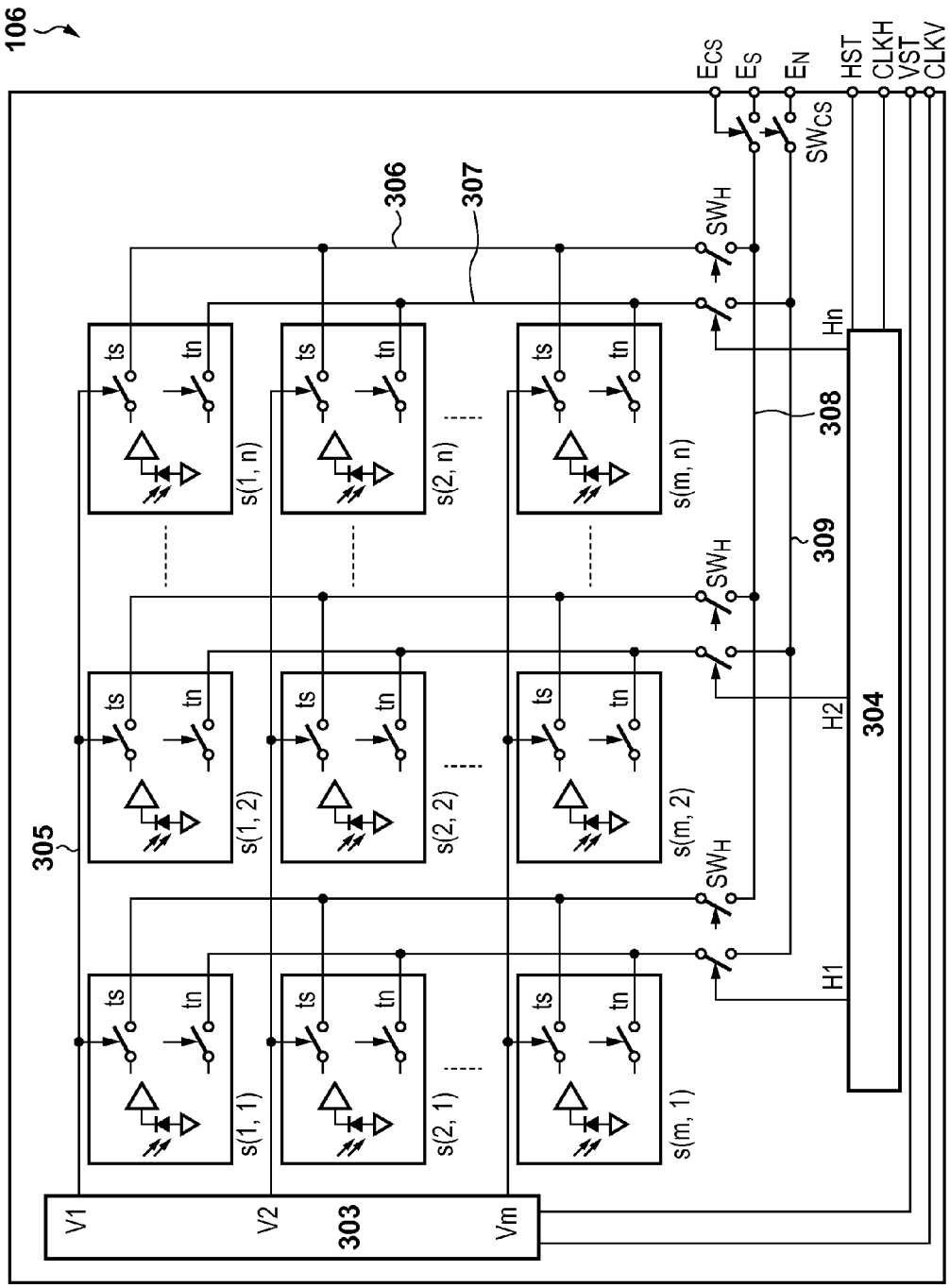
FIG. 3 is a view for explaining an example of the arrangement of a sensor unit.

FIG. 3 shows an example of the arrangement of the sensor unit 106 as one sensor chip. Each sensor unit 106 includes a plurality of sensors s, a vertical scanning circuit 303 for driving the plurality of sensors s, and a horizontal scanning circuit 304 for reading out signals from the plurality of sensors s.

The plurality of sensors s are arrayed to form, for example, m rows×n columns. Referring to FIG. 3, for example, the sensor on the first row and the second column is expressed as "s(1, 2)". Although described in detail later, each sensor s holds the S signal corresponding to a signal component and the N signal corresponding to a noise component. The S signal and the N signal are individually output from each sensor s.

The vertical scanning circuit 303 and the horizontal scanning circuit 304 are formed from, for example, shift registers, which operate based on control signals from the control unit 109. The vertical scanning circuit 303 functions as a driving unit which drives the sensors s as signal readout targets for each row based on control signals. More specifically, the vertical scanning circuit 303 supplies control signals to the plurality of sensors s via control lines 305, and drives the plurality of sensors s for each row based on the control signals. Based on control signals, the horizontal scanning circuit 304 selects the sensors s for each column and causes the sensors s on each selected column to sequentially output signals (horizontal transferring). More specifically, the horizontal scanning circuit 304 sequentially outputs signals (the S and N signals) from the sensors s driven by the vertical scanning circuit 303 to the outside via column signal lines 306 and 307 and analog output lines 308 and 309.

Each sensor unit 106 includes a terminal $E_S$ for reading out the S signals held in the sensors s and a terminal $E_N$ for reading out the N signals held in the sensors s. The sensor unit 106 further includes a select terminal $E_{CS}$. When the signal received at the terminal $E_{CS}$ is activated, the signals in each sensor s of the sensor unit 106 are read out via the terminals $E_S$ and $E_N$.

More specifically, each sensor s includes a terminal ts for outputting the S signal and a terminal tn for outputting the N signal. The terminal ts is connected to the column signal line 306. The terminal tn is connected to the column signal line 307. The column signal lines 306 and 307 respectively connected to the analog output lines 308 and 309 via switches $SW_H$ which are set in the conductive state in response to a control signal from the horizontal scanning circuit 304. Signals from the analog output lines 308 and 309 are output from the terminals $E_S$ and $E_N$ via switches $SW_{CS}$ which are set in the conductive state in response to the signal received at the terminal $E_{CS}$.

In addition, each sensor unit 106 includes terminals for receiving control signals for controlling the vertical scanning circuit 303 and the horizontal scanning circuit 304. A terminal VST receives a start pulse input to the vertical scanning circuit 303. A terminal CLKV receives a clock signal input to the vertical scanning circuit 303. A terminal HST receives a start pulse input to the horizontal scanning circuit 304. A terminal CLKH receives a clock signal input to the horizontal scanning circuit 304. The control unit 109 supplies these control signals.

With the above arrangement, in each sensor unit 106, the respective sensors s are controlled for each row, and signals (the S and N signals) in the sensors s on each column are sequentially output (horizontal transferring), thereby performing signal readout.

3. Example of Arrangement of Readout Unit

Figure 4:
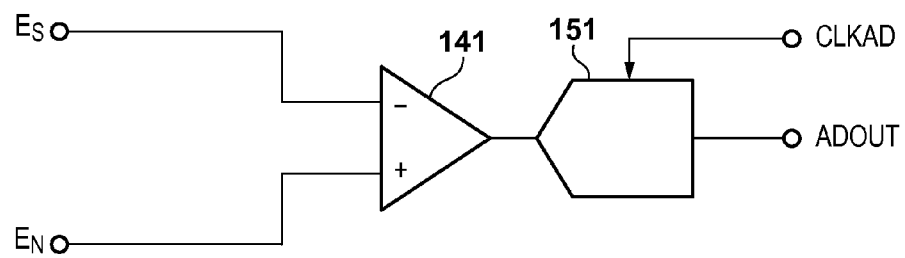
FIG. 4 is a circuit diagram for explaining an example of the arrangement of a readout unit.

FIG. 4 shows part of the circuit arrangement of the readout unit 20. A signal from the terminal $E_S$ is input to the inverting input terminal (indicated by "−" in FIG. 4) of the signal amplifying unit 141. A signal from the terminal $E_N$ is input to the non-inverting input terminal (indicated by "+" in FIG. 4) of the signal amplifying unit 141. The signal amplifying unit 141 amplifies the difference (signal value difference) between the signal from the terminal $E_S$ and the signal from the terminal $E_N$, and outputs a signal corresponding to the difference to the A/D conversion unit 151. The A/D conversion unit 151 has received a clock signal at the CLKAD terminal, and A/D-converts (analog-to-digital converts) the signal from the signal amplifying unit 141 based on the clock signal. The A/D-converted signal is output to the control unit 109 via the ADOUT terminal.

Note that for the sake of descriptive convenience, the signal amplifying unit 141 and the A/D conversion unit 151 have been exemplified. However, the same applies to an arrangement further including the multiplexer 131.

4. Example of Method of Driving Sensor Unit

Figure 5:
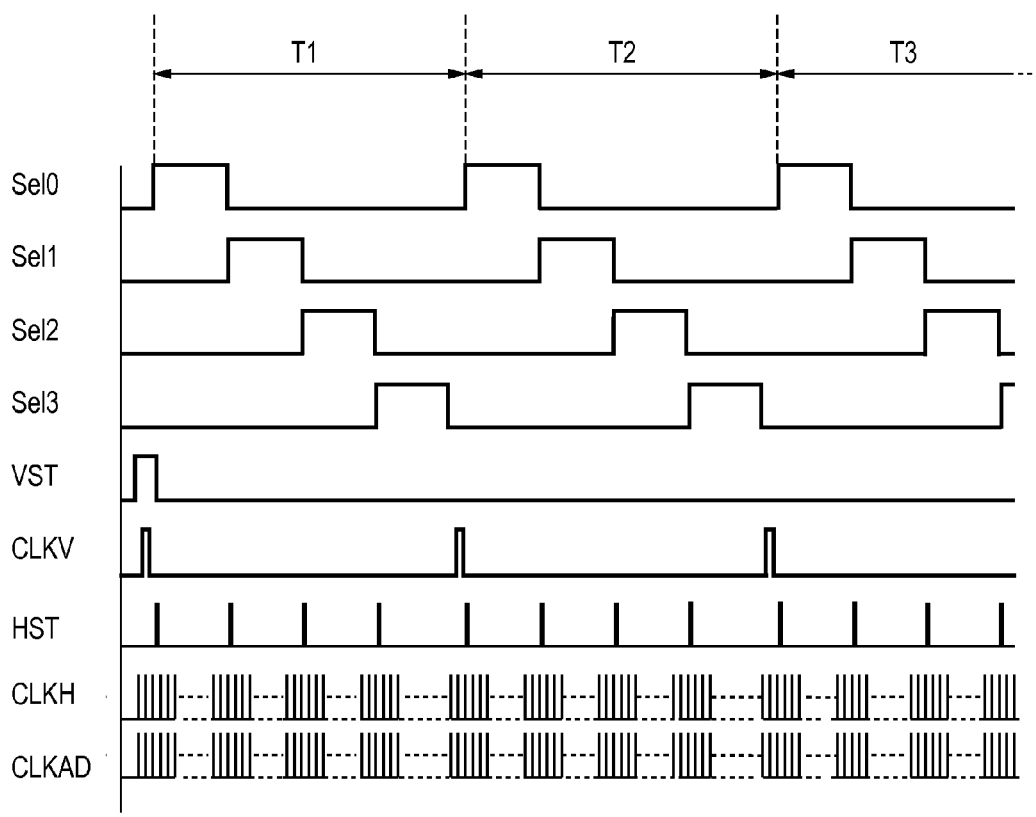
FIG. 5 is a timing chart for explaining an example of a method of driving a radiation imaging apparatus.

FIG. 5 is a timing chart for a readout operation RO for reading out signals from the imaging apparatus 100. The abscissa represents a time axis, and the ordinate represents each control signal. In this case, for the sake of descriptive convenience, a case in which signals are read out from the four sensor units 106, that is, $106_0$ to $106_3$, will be described.

Selection signals Sel, that is, Sel0 to Sel3, are control signals for selecting the sensor units 106 as signal readout targets. The selection signals Sel0 to Sel3 correspond to the sensor units $106_0$ to $106_3$, and are respectively input to the terminals $E_{CS}$ of the corresponding sensor units 106. If, for example, the sensor unit $106_1$ is a signal readout target, the signal Sel1 is set at high level (H), and the other selection signals Sel0, Sel2, and Sel3 are set at low level (L).

Other control signals including a signal VST indicate control signals to be input to the respective terminals. For example, a control signal input to the terminal VST is expressed as the signal VST. The same applies to other control signals.

The signal VST is a start pulse signal. Based on this signal, the vertical scanning circuit 303 selects the sensors s on the first row in the sensor unit 106 selected by the selection signal Sel. A signal CLKV is a clock signal. Every time this clock signal is received at the terminal CLKV, the selected row is sequentially shifted from the first row to the mth row (that is, the respective sensors s are sequentially selected from the first row to the mth row).

A signal HST is a start pulse signal. Based on this signal, the horizontal scanning circuit 304 selects the respective sensors s on the first column in the sensor unit 106 selected by the selection signal Sel. A signal CLKH is a clock signal. Every time the signal CLKH is received at the terminal CLKH, the selected column is sequentially shifted from the first column to the nth column (that is, the respective sensors s are sequentially selected row by row from the first column to the nth column).

A signal CLKAD is a clock signal. Based on this signal, an A/D conversion unit 108 A/D-converts a signal corresponding to the difference between the S signal and the N signal in each sensor s, as described above.

First of all, after the signal VST and the signal CLKV are set at H, the selection signal Sel0 to Sel3 are sequentially set at H to sequentially select the sensor units $106_0$, to $106_3$. At the timing when a given selection signal Sel is set at H (or after the signal is set at H), the signal HST is set at H. Thereafter, the clock signals CLKH and CLKAD are input until the next selection signal Sel is set at H.

With such a driving method, for example, in a first interval T1 in FIG. 5, signals from the respective sensors s on the first row are read out from each of the sensor units $106_0$, to $106_3$. More specifically, signals from the respective sensors s on the first row in the sensor unit $106_0$ are sequentially A/D-converted in the order of the first column to the nth column. Signals from the respective sensors s on the first row in the sensor unit $106_1$ are then A/D-converted in the same manner. Thereafter, signals from the respective sensors s on the first row in the sensor unit $106_2$ are A/D-converted in the same manner. Furthermore, thereafter, signals from the respective sensors s on the first row in the sensor unit $106_3$ are A/D-converted in the same manner.

Signal readout in a second interval T2 and the subsequent intervals (signal readout from the respective sensors s on the second row in each sensor unit 106) is performed in the same manner as in the first interval T1.

5. Example of Arrangement of Unit Sensor

Figure 6:
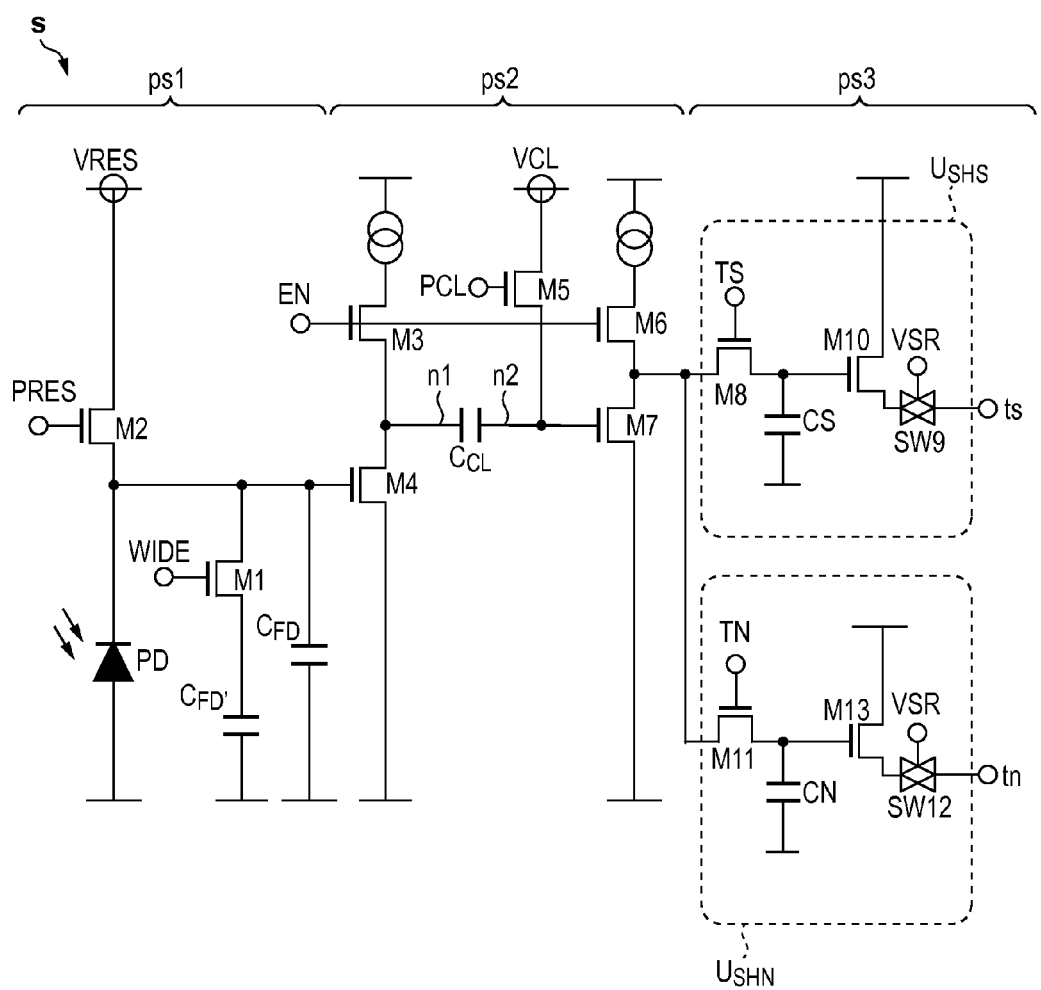
FIG. 6 is a circuit diagram for explaining an example of the arrangement of a unit sensor.

FIG. 6 exemplarily shows the circuit arrangement of each of unit sensors s arrayed in the sensor unit 106. Each sensor s includes, for example, a first portion ps1, a second portion ps2, and a third portion ps3.

The first portion ps1 includes a photodiode PD, transistors M1 and M2, a floating diffusion capacitor $C_{FD}$ (to be referred to as an FD capacitor $C_{FD}$ hereinafter), and a sensitivity switching capacitor $C_{FD}'$.

The photodiode PD is a photoelectric conversion element, which converts light (scintillator light) generated by the scintillator described above in accordance with irradiated radiation into an electrical signal. More specifically, the photodiode PD generates an amount of charges corresponding to the amount of scintillator light. The voltage of the FD capacitor $C_{FD}$ corresponding to the amount of generated charges is output to the second portion ps2.

The above description has exemplified the arrangement using the photodiode PD as a detection element for detecting radiation, assuming that the imaging unit 10 is of the indirect conversion type described above. However, another type of photoelectric conversion element may be used. In addition, if the imaging unit 10 is of the direct conversion type described above, a conversion element which directly converts radiation into an electrical signal may be used as the detection element.

The sensitivity switching capacitor $C_{FD}'$ is used to switch the sensitivity of the sensor s with respect to radiation, and is connected to the photodiode PD via the transistor M1 (switch element). When a signal WIDE is activated, the transistor M1 is set in the conductive state to output the voltage of the combined capacitor of the FD capacitor $C_{FD}$ and the capacitor $C_{FD}'$ to the second portion ps2.

With this arrangement, the sensor s is set in the low sensitivity mode when the signal WIDE is at H, and set in the high sensitivity mode when the signal WIDE is at L. In this manner, the sensitivity of the sensor s with respect to radiation can be changed depending on whether to use the capacitor $C_{FD}'$.

When a signal PRES is activated, the transistor M2 resets (initializes) the charges in the photodiode Pr), and resets the voltage output to the second portion ps2.

The second portion ps2 includes transistors M3 to M7, a clamp capacitor $C_{CL}$, and a constant current source (for example, a transistor with a current mirror arrangement). The transistor M3, the transistor M4, and the constant current source are connected in series to form a current path. When an enable signal EN input to the gate of the transistor M3 is activated, the transistor M4 which receives a voltage from the first Portion ps1 performs a source-follower operation to output a voltage corresponding to the voltage from the first portion ps1.

On the subsequent stage of the above arrangement, a clamp circuit constituted by transistors M5 to M7 and the clamp capacitor $C_{CL}$ is provided. More specifically, one terminal n1 of the clamp capacitor $C_{CL}$ is connected to the node between the transistor M3 and the transistor M4 of the second portion ps2. The other terminal n2 is connected to a clamp voltage VCL via the transistor M5. In addition, the transistor M6, the transistor M7, and the constant current source are connected in series to form a current path. The terminal n2 is connected to the gate of the transistor M7.

This arrangement removes kTC noise (so-called reset noise) generated in the photodiode PD of the first portion ps1.

More specifically, a voltage corresponding to the voltage from the first portion ps1 at the reset time described above is input to the terminal n1 of the clamp capacitor $C_{CL}$. When a clamp signal PCL is activated, the transistor M5 is set in the conductive state to input the clamp voltage VCL to the terminal n2 of the clamp capacitor $C_{CL}$. With this operation, the potential difference between the two terminals n1 and n2 of the clamp capacitor $C_{CL}$ is clamped as a noise component. In other words, the second portion ps2 can hold a voltage corresponding to the charges generated in the photodiode PD, and functions as a holding unit which holds a voltage corresponding to kTC noise in the clamp capacitor $C_{CL}$. In this arrangement, the second portion ps2 holds the voltage obtained by removing the clamped noise component from the voltage output from the transistor M4, which performs a source-follower operation, in accordance with the charges generated in the photodiode PD.

The enable signal EN is supplied to the gate of the transistor M6. When the enable signal EN is activated, the transistor M7 performs a source follower operation to output a voltage corresponding to the gate voltage of the transistor M7 to the third portion ps3. For example, the gate voltage of the transistor M7 changes as charges are generated in the photodiode PD, and a voltage corresponding to the changed voltage is output to the third portion ps3.

The third portion ps3 includes transistors M8, M10, M11, and M13, analog switches SW9 and SW12, and capacitors CS and CN. The unit constituted by the transistors M8 and M10, the analog switch SW9, and the capacitor CS will be referred to as a "first unit $U_{SHS}$" hereinafter.

In the first unit $U_{SHS}$, the transistor M8 and the capacitor CS constitute a sample/hold circuit. More specifically, a signal from the second portion ps2 is held as the S signal in the capacitor CS by switching the state (the conductive state or the non-conductive state) of the transistor M8 by using a control signal TS. In other words, the first unit $U_{SHS}$ functions as a first sampling unit which samples the S signal. The transistor M10 performs a source-follower operation. This amplifies the S signal. The amplified S signal is output from the terminal ts by setting the switch SW9 in the conductive state by using a control signal VSR.

Like the first unit $U_{SHS}$, the transistors M11 and M13, the analog switch SW12, and the capacitor CN constitute a "second unit $U_{SHN}$" which outputs a signal from the terminal tn. The second unit $U_{SHN}$ holds the N signal in the capacitor CN. In other words, the second unit $U_{SHN}$ functions as the second sampling unit which samples the N signal. In addition, as described above, the readout unit 20 reads out the difference between the S signal and the N signal via the terminals ts and tn. This removes FPN (Fixed Pattern Noise) caused by the second portion ps2.

As described above, the sensor s holds the S signal and the N signal in the capacitors CS and CN. The held S and N signals are read out by so-called nondestructive readout by setting the analog switches SW9 and SW12 in the conductive state. That is, while the transistors M8 and M11 are set in the non-conductive state, it is possible to read out the held S and N signals at an arbitrary timing.

6. First Embodiment

6.1 Example of Method of Driving Unit Sensor

FIGS. 7A, 7B, and 7C show driving timing charts for a sensor s according to this embodiment. For the sake of descriptive convenience, a case in which the sensor s is set in the high sensitivity mode that is, when a signal WIDE is at L) will be described.

As shown in FIG. 7A, at time t50, information necessary for the execution of capturing, for example, operation mode setting, is set. At time t51, reset driving RD for resetting each sensor s and a clamp capacitor $C_{CL}$ is performed in response to a synchronization signal SYNC. At time t60, sampling driving SD for reading out an image signal is performed. Thereafter, a readout operation RO (see FIG. 5) described above is performed.

FIG. 76 is a specific timing chart for the reset driving RD. In the reset driving RD, a reset operation of resetting the photodiode PD and an operation of holding a voltage corresponding to kTC noise in the clamp capacitor $C_{CL}$ are performed in response to the synchronization signal SYNC.

At time t51, an enable signal EN is set at H so set transistors M3 and M6 in the conductive state. This makes transistors M4 and M7 ready for a source-follower operation.

At time t52, a signal PRES is set at H to set a transistor M2 in the conductive state. This connects a photodiode PD to a reference voltage VRES and resets the photodiode PD and the voltage of a capacitor $C_{FD}$. In addition, a voltage corresponding so the gate voltage of the transistor M4 at the reset time is supplied to one terminal n1 of the clamp capacitor $C_{CL}$ (the terminal on the transistor M4 side).

At time t53, a signal PCL is set at H to set a transistor M5 in the conductive state. With this operation, a clamp voltage VCL is supplied to a terminal n2 of the clamp capacitor $C_{CL}$ (the terminal on the transistor M7 side).

At time t54, the signal PRES is set at L to set she transistor M2 in the non-conductive state. With this operation, the terminal n1 of the clamp capacitor $C_{CL}$ is set to a voltage corresponding to the gate voltage of the transistor M4 at the reset time.

At time t55, the signal PCL is set at L to set the transistor M5 in the non-conductive state. With this operation, the clamp capacitor $C_{CL}$ holds charges corresponding to the potential difference between the terminal n1 and the terminal n2 (the potential difference between the voltage based on the reference voltage VRES and the clamp voltage VCL), thereby clamping kTC noise caused by the heat of the photodiode PD or the like.

At time t56, the enable signal EN is set at L to set the transistors M3 and M6 in the non-conductive state. With this operation, the transistors M4 and M7 are set in the non-conductive state. Thereafter, the above exposure permission signal 114 is set at H (permitted state).

With the above operation, a series of operations for the reset driving RD is complete. That is, in the reset driving RD, while the photodiode PD is reset, the clamp capacitor $C_{CL}$ is reset, and a voltage corresponding to kTC noise is held in the reset clamp capacitor $C_{CL}$. Subsequently, upon radiation irradiation, the photodiode PD generates charges corresponding to the dose of irradiated radiation.

Note that the reset driving RD is collectively performed for all the sensors to prevent control timing differences, thereby maintaining data continuity between adjacent sensor units and adjacent sensors.

FIG. 7C is a specific timing chart for sampling driving SD. In the sampling driving SD, a signal level corresponding to the amount of charges generated in the photodiode PD is sampled as the S signal, and held in a capacitor CS. In addition, in the sampling driving SD, a noise level corresponding to the fixed pattern noise caused by manufacture variations of the arrangements of sensors s and the respective elements is sampled as the N signal and held in a capacitor CN.

At time t60, the enable signal EN is set at H to set the transistors M3 and M6 in the conductive state to make the transistors M4 and M7 ready for a source-follower operation. The gate voltage of the transistor M4 changes in accordance with the amount charges generated and accumulated in the photodiode PD. A voltage corresponding to the changed gate voltage is input to the terminal n1 of the clamp capacitor $C_{CL}$ to change the potential at the terminal n1. The potential at the terminal n2 of she clamp capacitor $C_{CL}$ then changes with a change in the potential at the terminal n1.

At time t61, a signal TS is set at H to set a transistor M8 in the conductive state. With this operation, the capacitor CS is charged with a voltage corresponding so the potential at the terminal n2 (the above changed potential at the terminal n2).

At time t62, the signal TS is set at L to set the transistor M8 in the non-conductive state. With this operation, the above voltage is fixed in the capacitor CS (sampling of the S signal). At time t62, the exposure permission signal 114 is set at L (inhibited state).

At time t63, a signal PCL is set at H to set the transistor M5 in the conductive state. With this operation, the clamp voltage VCL is supplied to the terminal n2 of the clamp capacitor $C_{CL}$ (the terminal on the transistor M7 side).

At time t64, a signal TN is set at H to set a transistor M11 in the conductive state. With this operation, the capacitor CN is charged with a voltage corresponding to the potential at the terminal n2 (the above supplied voltage VCL).

At time t65, the signal TN is set at L to set the transistor M11 in the non-conductive state. With this operation, the above voltage is fixed in the capacitor CN (sampling of the N signal).

At time t66, the signal PRES is set at H to set the transistor M2 in the conductive state. With this operation, the voltage of FD capacitor $C_{FD}$ (and the capacitor $C_{FD}'$) is reset to the reference voltage VRES, and the voltage at the terminal n1 is also reset.

At time t67, the signal PRES is set at L to set the transistor M2 in the non-conductive state. With this operation, the terminal n1 of the clamp capacitor $C_{CL}$ is set to a voltage corresponding to the gate voltage of the transistor M4 at the reset time.

Finally, at time t68, the signal PCL is set at L to set the transistor M5 in the non-conductive state. At time t69, the enable signal EN is set at L to set the transistors M3 and M6 in the non-conductive state (set the transistors M4 and M7 in the non-conductive state).

In summary, in the sampling driving SD, the S signal is sampled in the interval between time t61 and time t62. In the interval between time t63 and time t68, the potential at the terminal n2 of the clamp capacitor $C_{CL}$ is reset. During this interval, the N signal is sampled in the interval between time t64 and time t65, and the photodiode PD is then reset in the interval between time t66 and time t67.

In the above manner, a series of operations for the sampling driving SD is complete. That is, in the sampling driving SD, a signal level corresponding to the amount of charges generated in the photodiode PD is sampled as the S signal and held in the capacitor CS, and a noise level corresponding to fixed pattern noise is sampled as the N signal and held in the capacitor CN.

Note that the sampling driving SD can be collectively performed for all the sensors to prevent control timing differences between the respective sensor units 106 as in the reset driving RD.

In the readout operation RO to be performed afterward, as described above, signals corresponding to the differences between the S signals and the N signals are sequentially A/D-converted and output as image data.

6.2. Example of Method of Changing Frame Rate

FIGS. 8A, 8B, 8C, and 8D show driving timing charts when changing a frame rate at the time of movie image capturing. In movie image capturing, the reset driving RD, the sampling driving SD, and the readout operation. RO, described above, are repeatedly performed. One image data read out by this series of operations is also called a "frame". After signal readout of a given frame is complete, signal readout of the next frame starts.

In this case, the time between the instant the photodiode PD is reset and the instant the S signal is sampled corresponds to the charge accumulation time during which the charges generated in the photodiode PD are accumulated. FIGS. 8A to 8D are timing charts for a case in which the frame rate is changed while the charge accumulation time is fixed. The frame rate increases in the order of FIGS. 8A, 8B, 8C, and 8D. The frame rate may be changed, as needed, in accordance with the observation target region of an object, the observation method or the like to be used, and the capturing conditions.

Figure 8A:
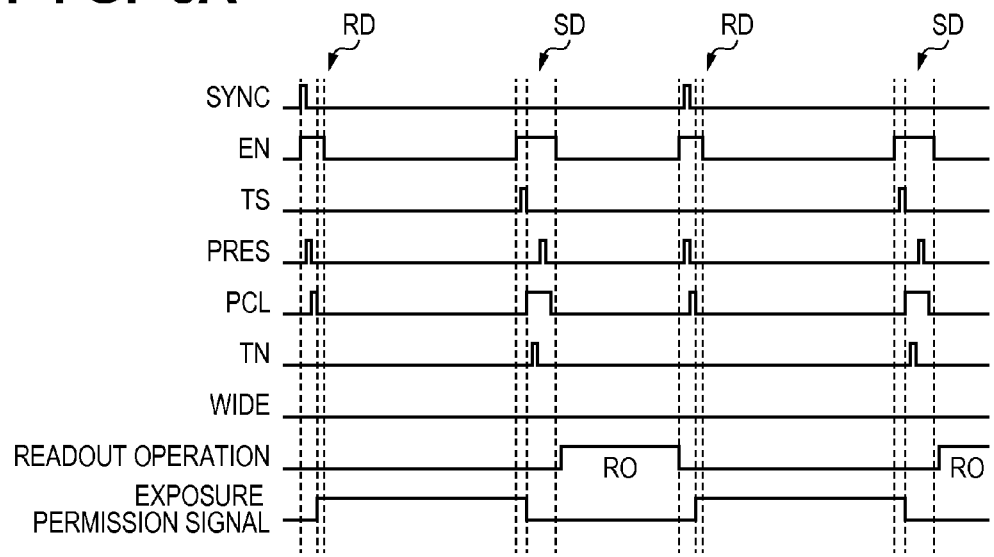
FIGS. 8A to 8D are driving timing charts each for explaining an example of driving a sensor.

FIG. 8A is a timing chart corresponding to the first frame rate which is the minimum frame rate among those in the four cases described above, and a simplified chart of FIGS. 7A, 7B, and 7D described above. In this case, after the readout operation RO is complete, the reset driving RD is performed.

Figure 8B:
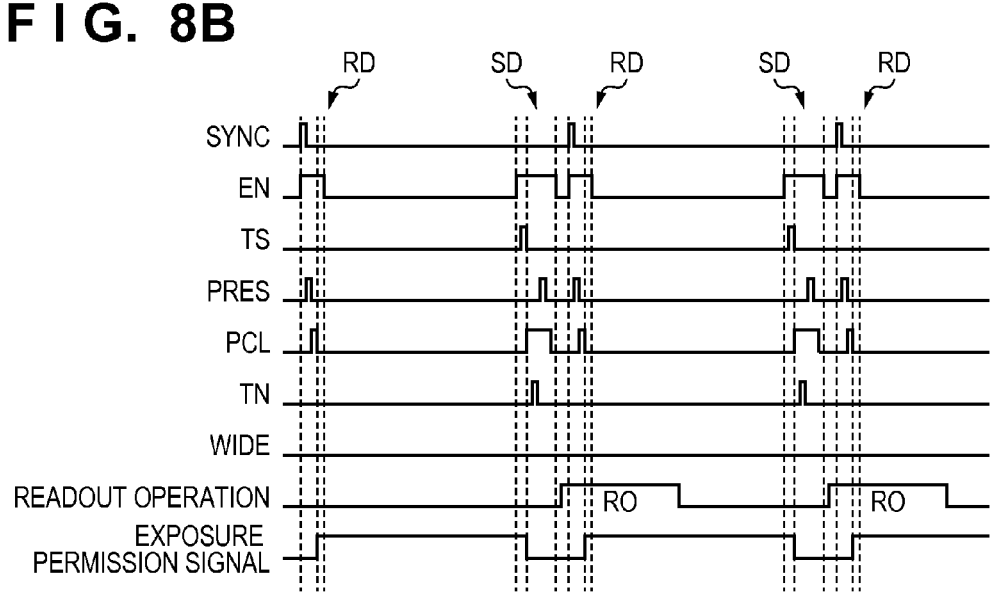

FIG. 8B is a timing chart corresponding to the second frame rate higher than the first frame rate. In this case, while the readout operation RO is performed, the reset driving RD is performed. As described with reference to FIG. 6, while the transistors M8 and M11 are set in the non-conductive state, the S and N signals held in the capacitors CS and CN are read out at an arbitrary timing. Therefore, the S and N signals held in the capacitors CS and CN by the sampling driving SD are not reset by the reset driving RD and are properly read out by the readout operation RO.

Figure 8C:
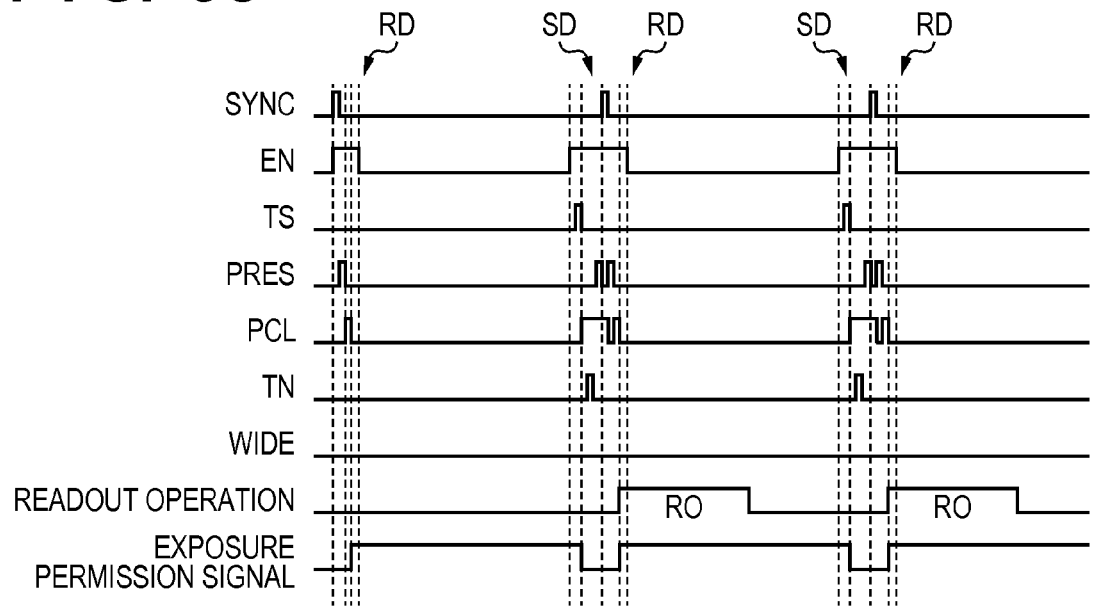

FIG. 8C is a timing chart corresponding to the third frame rate higher than the second frame rate. In this case, the synchronization signal SYNC is received before the enable signal EN is set at L in the sampling driving SD, and the next reset driving RD starts while the enable signal EN is kept at H. In other words, a pulse of the enable signal EN in the sampling driving SD and a pulse of the enable signal EN in the sampling driving SD form one pulse. With this driving method, the S and N signals held in the capacitors CS and CN are not reset by the reset driving RD, and are properly read out by the readout operation RO.

Figure 8D:
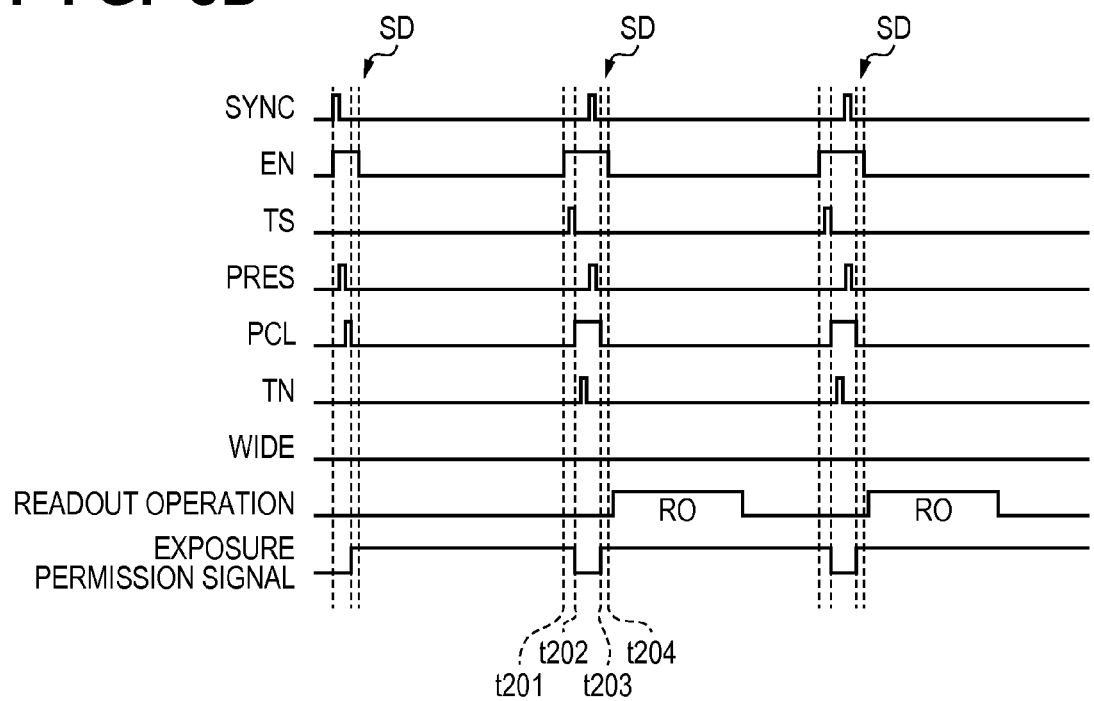

FIG. 8D is a timing chart corresponding to the fourth frame rate higher than the third frame rate. In this case, the synchronization signal SYNC is received before the signals PRES and PCL are set at L in the sampling driving SD, the next reset driving RD starts while the signals PRES and PCL are kept at H. In other words, a pulse of each of the signals PRES and PCL in given sampling driving SD and a pulse of each of the signals PRES and PCL in the next sampling driving SD form one pulse. With this driving method, the S and N signals held in the capacitors CS and CN are not reset by the reset driving RD, and are properly read out by the readout operation RO.

In another aspect, in the case shown in FIG. 8D, as exemplarily indicated by the interval between time t201 and time t204, the reset driving RD may be omitted. As described with reference to FIG. 7C, in the sampling driving SD according to this embodiment, while the transistor M5 is set in the conductive state in the interval between time t63 and t68, the photodiode PD is reset after the N signal is sampled. For this reason, in this case, it is possible to increase the frame rate while the sampling driving SD also functions as the reset driving RD.

A driving timing chart for continuous capturing will be exemplified below with reference to FIG. 9. In this case, the exposure permission signal is maintained at H, and sampling driving $SD_S$ is performed every time the synchronization signal SYNC is received. For comparison, consider a case in which a driving operation is performed with the above charge accumulation time being the same as that in each of the cases shown in FIGS. 8A, 8B, 8C, and 8D.

The operation content of the sampling driving $SD_S$ is the same as that of the sampling driving SD described with reference to FIGS. 7A, 7B, and 7C. For example, the synchronization signal SYNC is received at time t221, and the same operation as that in the sampling driving SD starts. Assume that the sampling driving $SD_S$ ends at time t222. The sampling driving $SD_S$ also functions as the reset driving RD.

Figure 9:
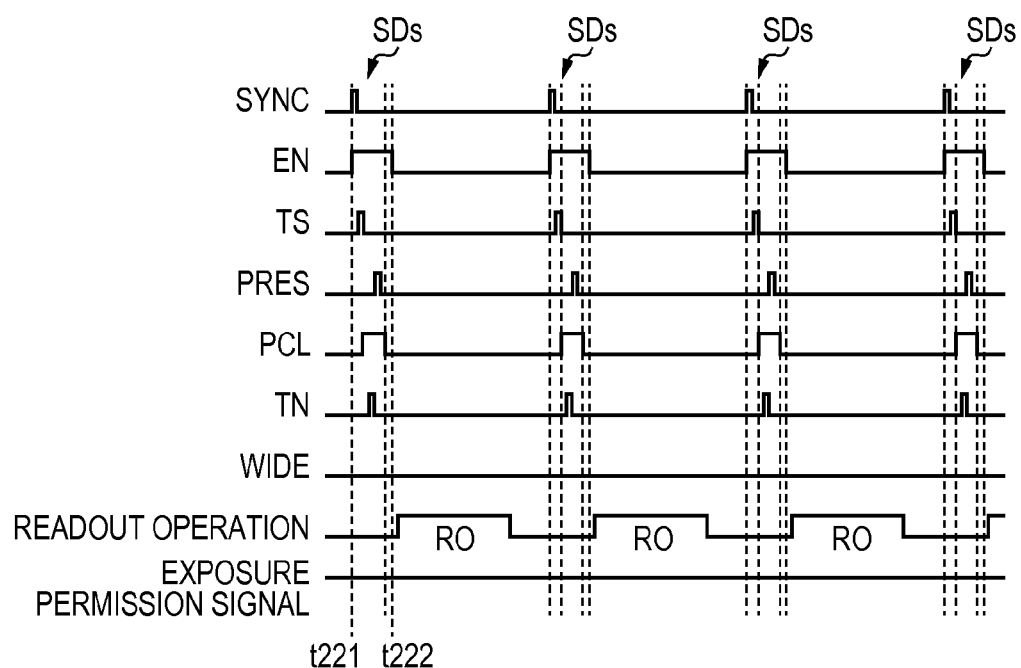
FIG. 9 is a driving timing chart for explaining an example of driving a sensor.

Referring to the case shown in FIG. 8D, the fourth frame rate is equal to that in continuous capturing in the case shown in FIG. 9. In the case shown in FIG. 8D, it is possible to perform movie image capturing at the fourth frame rate equal to that in continuous capturing, with the sampling driving SD also functioning as the reset driving RD.

As described above, this embodiment is advantageous in performing radiation capturing while changing the frame rate.

6.3. Comparative Example

Like FIGS. 8A to 8D, FIGS. 10A to 10D each show a driving timing chart in a comparative example when the frame rate is changed at the time of movie image capturing.

Figure 10A:
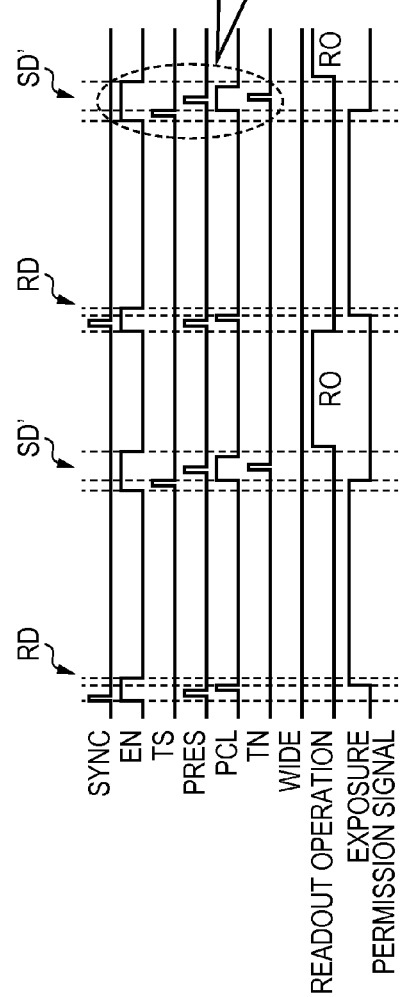
FIGS. 10A to 10D are driving timing charts each for explaining an example of driving a sensor.

In this comparative example, sampling driving SD' indicated by an enlarged view in FIG. 10A is performed. In the sampling driving SD', sampling is performed in the interval between time t61' and time t63'. Subsequently, while the photodiode PD is reset in the interval between time t64' and time t66', the potential at the terminal n2 of the clamp capacitor $C_{CL}$ is reset in the interval between time t65' and time t69'. During this interval, sampling is performed in the interval between time t67' and time t68'.

Figure 10B:
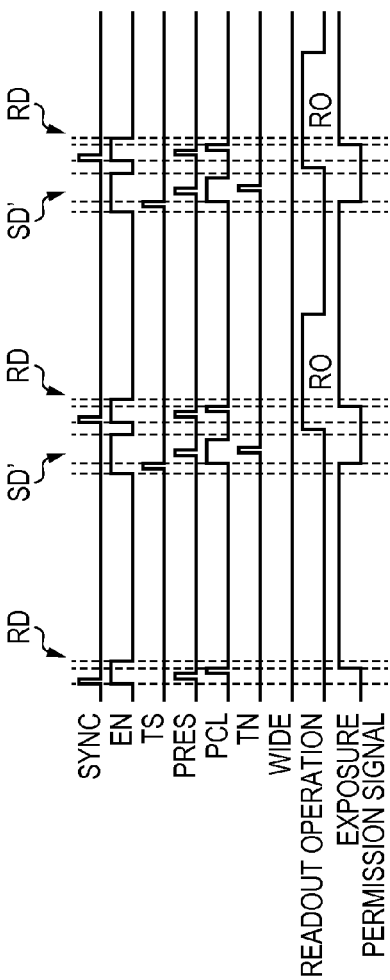
Figure 10C:
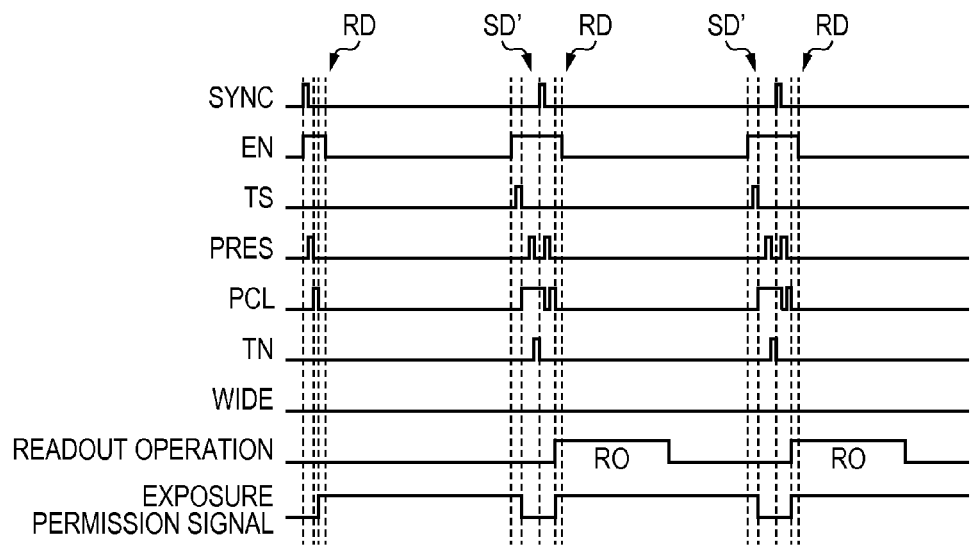

In the three cases shown in FIGS. 10A to 10C, it is possible to increase the frame rate in the same manner as in FIGS. 8A to 8C.

Figure 10D:
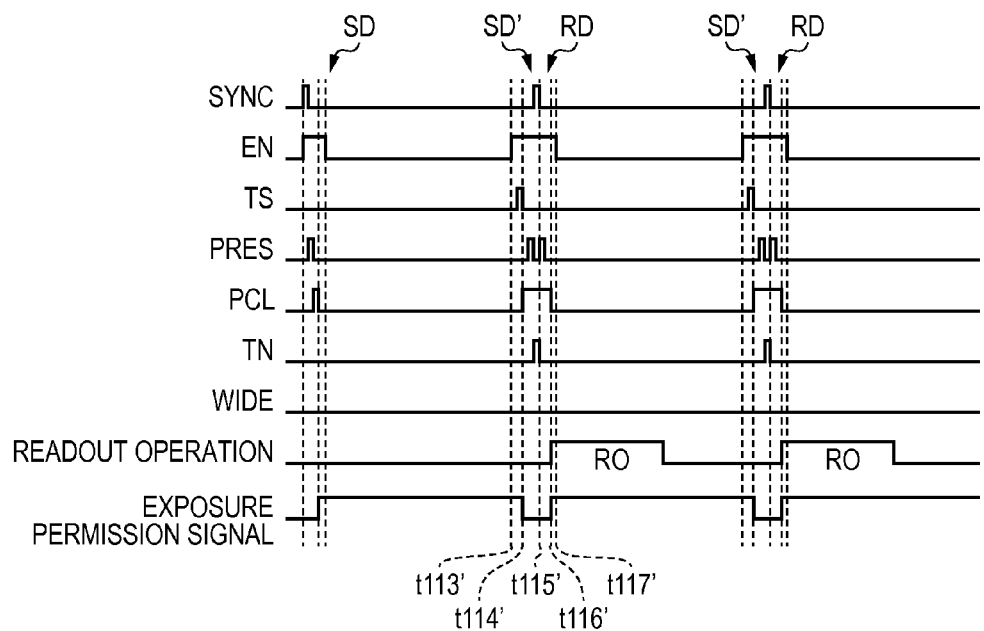

In the case shown in FIG. 10D, however, the signal PRES is set at H again at time t115' after the signal TN is set at L. Since it is necessary to guarantee the pulse width of the signal PRES, the exposure permission signal is set at H after the lapse of a predetermined time. As a result, the interval during which the exposure permission signal is at L (exposure inhibition interval, that is, the interval between time t114' and time t116') is longer than that in the case shown in FIG. 8D (the interval between time t202 and time t203). For this reason, in the case shown in FIG. 10D, it is not possible to achieve a frame rate equal to that in continuous capturing described with reference to FIG. 9.

This embodiment is therefore advantageous in performing radiation capturing while changing the frame rate, and is also advantageous in increasing the frame rate at the time of movie image capturing.

6.4. Modification of Embodiment

Figure 11:
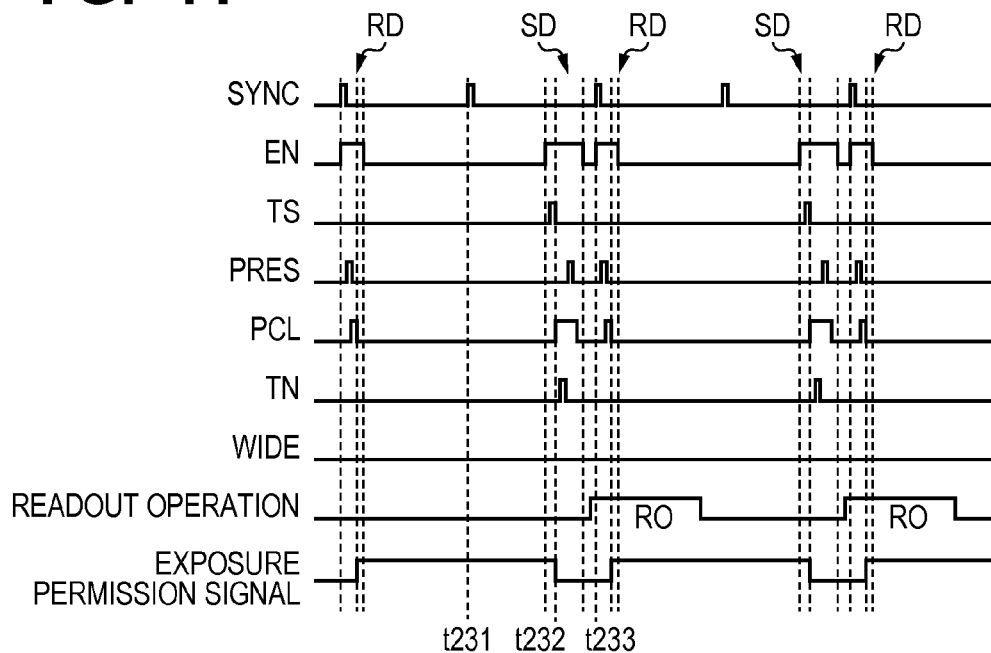
FIG. 11 is a timing chart for explaining an example of driving a sensor.

FIG. 11 shows a driving timing chart in the first modification when the synchronization signal SYNC is received in movie image capturing while one given image data is obtained. For example, at time t231, although the synchronization signal SYNC is received, since the sampling driving SD for obtaining the image data is not complete at this time point, the reset driving RD does not start. Assume that the sampling driving SD is complete afterward at time t232. Subsequently, at time t233, the synchronization signal SYNC is received, since the sampling driving SD is complete at this time point, the reset driving RD starts in response to the synchronization signal SYNC.

In other words, after given sampling driving SD is complete, the reset driving RD starts in response to the first synchronization signal SYNC. Thereafter, the sampling driving SD is performed, and the readout operation RO is performed. On the other hand, when the synchronization signal SYNC is received before the completion of the sampling driving SD, the reset driving RD starts. This driving method is also advantageous in preventing the imaging apparatus 100 from malfunctioning in movie image capturing.

Figure 12:
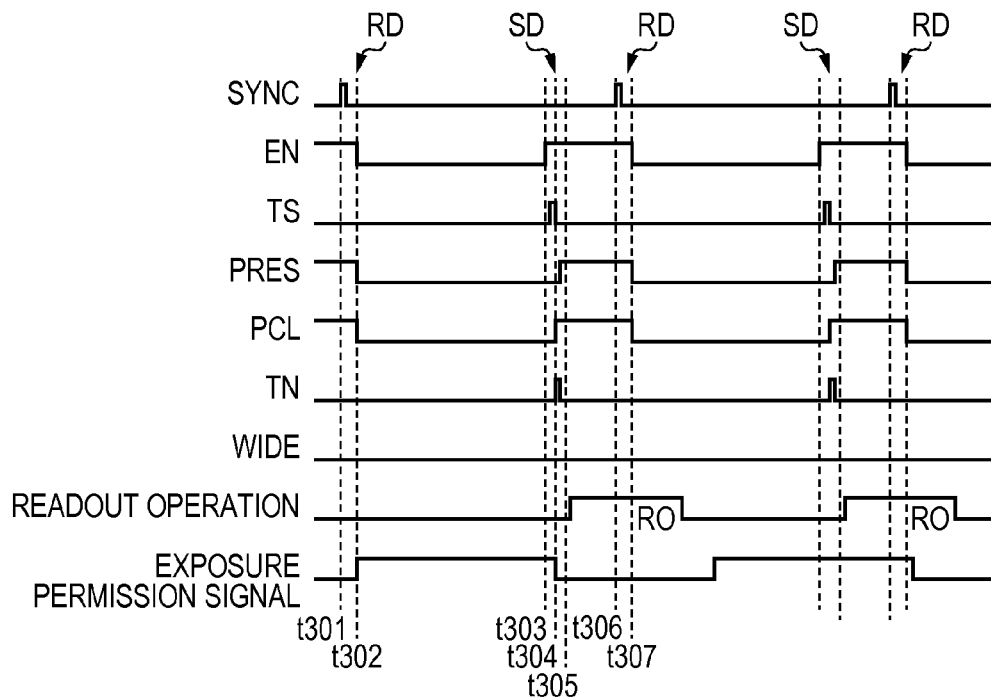
FIG. 12 is a timing chart for explaining an example of driving a sensor.

FIG. 12 shows a driving timing chart in the second modification when some signals are maintained at H in the interval from given sampling driving SD to the next reset driving RD. This case corresponds to the second frame rate described with reference to FIG. 8B. In the case shown in FIG. 8B, the signals EN, PRES, and PCL are kept at L in the interval between the end of given sampling driving SD and the start of the next reset driving RD. In this modification, as exemplarily shown in FIG. 12, the signals EN, PRES, and PCL are maintained at H in the interval from given sampling driving SD to the next reset driving RD (for example, in the interval between time t305 and time t307). With this driving method as well, the imaging apparatus 100 can be operated. Note that the signal EN is preferably set at L, for example, in the interval between time t305 and time t306, from the viewpoint of a reduction in the power consumption of the imaging apparatus 100.

7. Second Embodiment

According to the reset driving RD described above (see FIGS. 7A, 7B, and 7C), the photodiode PD and the clamp capacitor $C_{CL}$ are reset. However, immediately after radiation capturing, the potentials at the respective portions in the third portion ps3 may be unstable, for example, residual charges may exist in the sampling capacitors CS and CN. If the sampling driving SD and the readout operation RO are performed upon the reset driving RD in this state, afterimages, unevenness, or the like may occur in a radiation image. For this reason, when performing signal readout from the first frame after the start of radiation capturing, it is preferable to properly reset also the third portion ps3.

Figure 13:
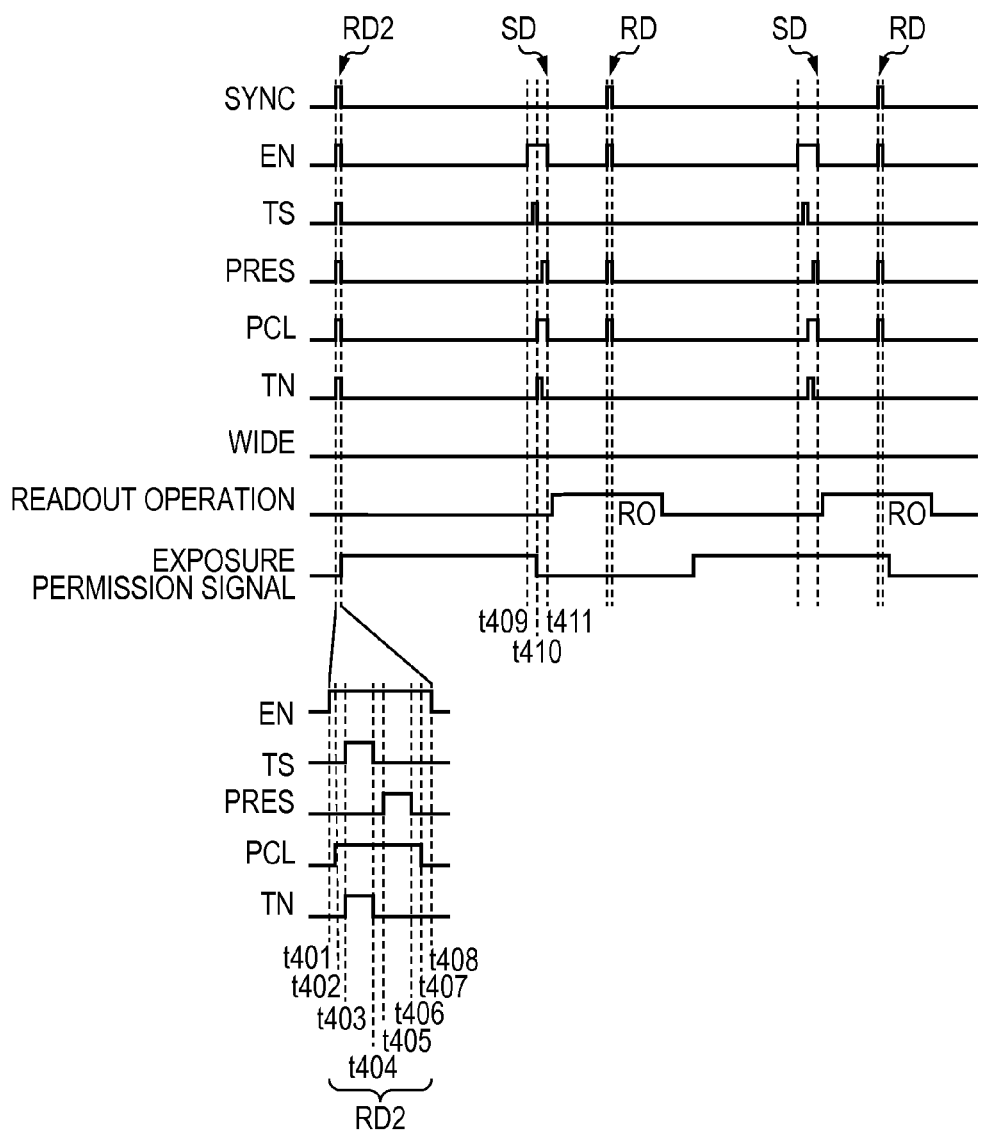
FIG. 13 is a timing chart for explaining an example of driving a sensor.

FIG. 13 shows a driving timing chart for a sensor s according to this embodiment. After the start of radiation capturing, first of all, reset driving RD2 according to the embodiment is performed in the interval between time t401 and time t408. In the interval between time t409 and time t411, sampling driving SD is then performed. Thereafter, a readout operation RO is performed. Subsequently, a series of operations including reset driving RD, the sampling driving SD, and the readout operation RO is repeatedly performed in the same manner as in the first embodiment.

According to the reset driving RD2, a signal EN is set at H (transistors M3 and M6 are set in the conductive state, and transistors M4 and M7 start a source-follower operation) at time t401. In the interval between time t402 and time t407, a signal PCL is then set at H (the potential at a terminal n2 of a clamp capacitor $C_{CL}$ is reset). In this interval, signals TS and TN are set at H (capacitors CS and CN are reset; more specifically, both the capacitors CS and CN hold the N signals) in the interval between time t403 and time t404. In addition, in the interval between time t405 and time 406, a signal PRES is set at H (the photodiode PD is reset). Finally, at time t408, the signal EN is set at L (the transistors M3 and M6 are set in the non-conductive state, and the transistors M4 and M7 finish the source-follower operation).

Note that like the reset driving RD described above, the reset driving RD2 can be collectively performed for all the sensors to prevent control timing differences among the respective sensor units 106.

This embodiment can obtain the same effects as those in the first embodiment, and is also advantageous in improving the quality of a radiation image obtained by signal readout from the first frame after the start of radiation capturing.

8. Third Embodiment

When changing (greatly or slightly) the frame rate during capturing, since the timing of reset driving RD greatly changes after sampling driving SD, capacitors CS and CN differ in the leakage amount of charges. More specifically, when the frame rate is low, the time interval between the end of the sampling driving SD and the start of the reset driving RD is longer than when the frame rate is high, and hence the leakage amounts of charges from the capacitors CS and CN are large. This can lead to a deterioration in the image quality of a radiation image. For this reason, when the frame rate is low, it is preferable to perform the reset driving RD2 described above.

Figure 14:
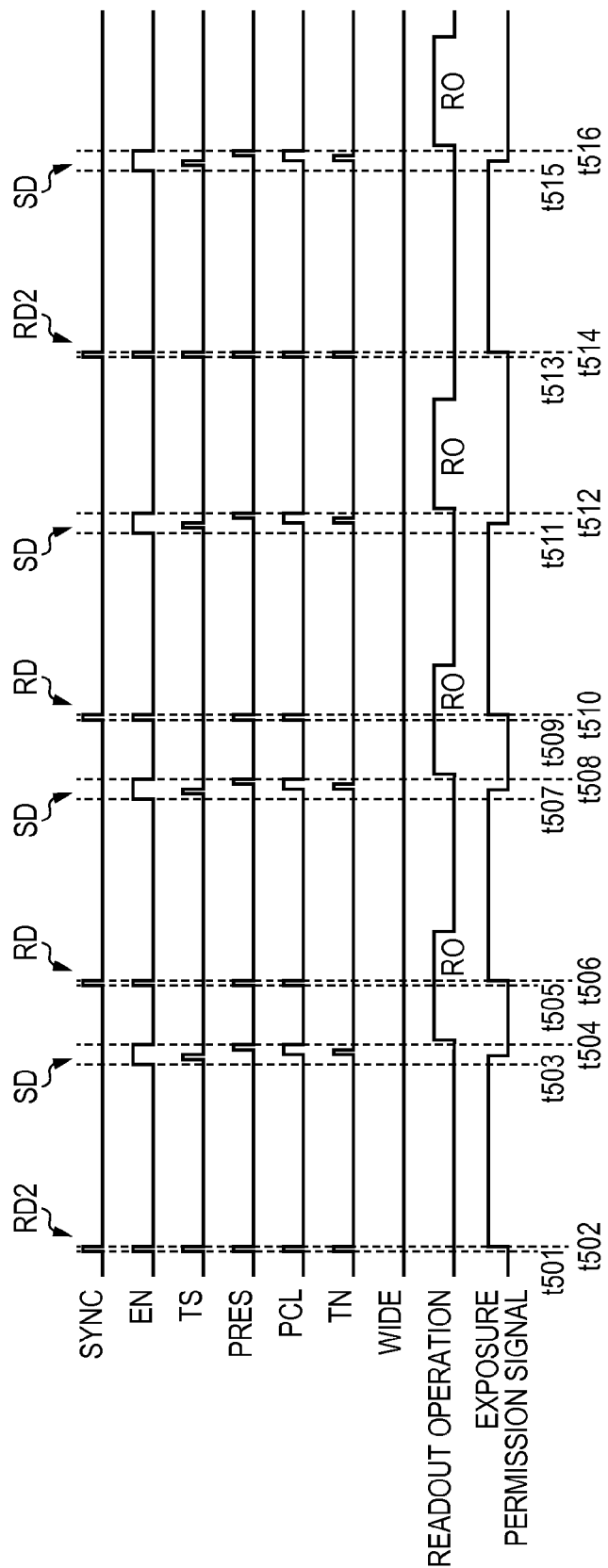
FIG. 14 is a timing chart for explaining an example of driving a sensor.

FIG. 14 is a driving timing chart for a sensor s according to this embodiment. In this case, while a charge accumulation time is maintained constant, the frame rate is changed halfway through the operation.

After the start of radiation capturing, first of all, the reset driving RD2 is performed in the interval between time t501 and time t502. In the interval between time t503 and time t504, the sampling driving SD is performed. Thereafter, in the interval between time t505 and time t506, the reset driving RD is performed while the readout operation RO is performed. Likewise, from time t507 forward, a series of operations including the reset driving RD, the sampling driving SD, and the readout operation RO is repeatedly performed. From time t512 forward, the frame rate is changed to a low frame rate. In this case, in the interval between time t513 and time t514 after the completion of the readout operation RO, the reset driving RD2 is performed. Subsequently, the sampling driving SD and the readout operation RO are performed.

In this case, if the reset driving RD2 is performed while the readout operation RO is performed, the capacitors CS and CN are reset before the S and N signals held in them are read out. For this reason, it is preferable to perform the reset driving RD2 after the completion of the readout operation RO, as exemplarily indicated by the interval between time t513 and time t514.

This embodiment can obtain the same effects as those in the first embodiment, and is also advantageous in improving the quality of radiation images obtained at different frame rates.

9. Others

Although several preferred embodiments have been described above, the present invention is not limited to them. The respective embodiments may be partly changed or combined with each other in accordance with the purpose and the like. In addition, the present invention can be applied to any sensor which includes a detection element such as the photodiode PD, a holding unit such as the clamp capacitor $C_{CL}$, reset units which individually reset them, and sampling units which individually sample the S signal and the N signal. Therefore, the arrangement examples of each sensor s and the driving method examples for each sensor s are not limited to the modes exemplified by the respective embodiments.

In addition, each embodiment of the present invention described above can also be implemented by causing a computer to execute programs or software. More specifically, for example, programs which implement the functions of the respective embodiments described above are supplied to a system or apparatus via a network or various types of storage media. The computer (or the CPU, MPU, or the like) of the system or apparatus reads out and execute the programs afterward.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083094, filed Apr. 14, 2014, which is hereby incorporated by reference herein in its entirety.

What is claimed is:

1. A radiation imaging apparatus comprising a sensor and a driving unit configured to drive said sensor,
said sensor including:
a detection element configured to detect radiation;
a first reset unit configured to reset said detection element;
a holding unit configured to hold a voltage corresponding to a signal from said detection element;
a second reset unit configured to reset said holding unit;
a first sampling unit configured to sample a signal corresponding to a voltage of said holding unit; and
a second sampling unit configured to sample a signal corresponding to the voltage of said holding unit,
wherein said driving unit drives said sensor so as to repeatedly perform
a first operation of making said first sampling unit sample a first signal corresponding to a voltage of said holding unit which has changed in accordance with a dose of radiation detected by said detection element after said holding unit holds a voltage corresponding to a signal from said detection element when said first reset unit resets said detection element, and
a second operation of making said first reset unit reset said detection element after said second sampling unit samples a second signal corresponding to a voltage of said reset holding unit, after the first operation, while said second reset unit resets said holding unit, and
said driving unit further drives said sensor, in a first mode in which an interval from an end of the given second operation to a start of the next first operation is a first interval, so as to execute a third operation of making said first reset unit reset said detection element and making said second reset unit reset said holding unit in the interval,
while the second operation also functions as the third operation in a second mode in which an interval from an end of the given second operation to a start of the next first operation is a second interval shorter than the first interval.

2. The apparatus according to claim 1, further comprising an output unit configured to output a signal from said sensor, said output unit outputting a signal corresponding to a difference between the first signal sampled by said first sampling unit and the second signal sampled by said second sampling unit.

3. The apparatus according to claim 2, wherein said output unit includes a conversion unit configured to analog-to-digital convert a difference between the signal values.

4. The apparatus according to claim 1, wherein said driving unit has received a synchronization signal from outside
performs, in the first mode, the third operation in response to the synchronization signal received first after execution of the given second operation, and does not perform afterward the third operation when the synchronization signal is received before completion of a series of operations from the next first operation to the second operation.

5. The apparatus according to claim 2, wherein the interval from the end of the given second operation to the start of the next first operation further includes a third mode which is a third interval shorter than the first interval and longer than the second interval, and
said driving unit drives said sensor
so as to perform, in the first mode, the third operation after said output unit outputs a signal corresponding to the difference between the signal values while performing a fourth operation of making said first sampling unit sample a signal corresponding to a voltage of said holding unit reset in the third operation and making said second sampling unit sample the signal, and
so as to perform, in the third mode, the third operation, of the third operation and the fourth operation, while said output unit outputs a signal corresponding to a difference between the signal values.

6. The apparatus according to claim 5, wherein said driving unit has received a synchronization signal from outside performs, in the first mode, the third operation and the fourth operation in response to the synchronization signal received first after execution of the given second operation, does not perform afterward the third operation and the fourth operation when the synchronization signal is received before completion of a series of operations from the next first operation to the second operation, performs, in the third mode, the third operation in response to the synchronization signal received first after execution of the given second operation, and does not perform the third operation when the synchronization signal is received before completion of a series of operations from the next first operation to the third operation.

7. A radiation inspection apparatus comprising:
a radiation imaging apparatus defined in claim 1, and
a radiation source configured to generate radiation.

8. The apparatus according to claim 7, further comprising a C-arm type radiation fluoroscopic examination apparatus.

9. A method of driving a radiation imaging apparatus including a sensor,
the sensor including a detection element configured to detect radiation, a first reset unit configured to reset the detection element, a holding unit configured to hold a voltage corresponding to a signal from the detection element, a second reset unit configured to reset the holding unit, a first sampling unit configured to sample a signal corresponding to a voltage of the holding unit, and a second sampling unit configured to sample a signal corresponding to the voltage of the holding unit,
the method comprising
a step of repeatedly performing a first operation of making the first sampling unit sample a first signal corresponding to a voltage of the holding unit which has changed in accordance with a dose of radiation detected by the detection element after the holding unit holds a voltage corresponding to a signal from the detection element when the first reset unit resets the detection element, and a second operation of making the first reset unit reset the detection element after the second sampling unit samples a second signal corresponding to a voltage of the reset holding unit, after the first operation, while the second reset unit resets the holding unit,
wherein in the step, when an interval from an end of the given second operation to a start of the next first operation is a first interval, a third operation is further executed, in which the first reset unit resets the detection element and the second reset unit resets the holding unit in the interval, and
when an interval from an end of the given second operation to a start of the next first operation is a second interval shorter than the first interval, execution of the third operation is suppressed.

10. A radiation imaging apparatus comprising a sensor and a driving unit configured to drive said sensor,
said sensor including:
a detection element configured to detect radiation;
a first reset unit configured to reset said detection element;
a holding unit configured to hold a voltage corresponding to a signal from said detection element;
a second reset unit configured to reset said holding unit;
a first sampling unit configured to sample a signal corresponding to a voltage of said holding unit; and
a second sampling unit configured to sample a signal corresponding to the voltage of said holding unit,
wherein said driving unit drives said sensor so as to repeatedly perform
a first operation of making said first sampling unit sample a first signal corresponding to a voltage of said holding unit which has changed in accordance with a dose of radiation detected by said detection element after said holding unit holds a voltage corresponding to a signal from said detection element when said first reset unit resets said detection element, and
a second operation of making said first reset unit reset said detection element after said second sampling unit samples a second signal corresponding to a voltage of said reset holding unit, after the first operation, while said second reset unit resets said holding unit, and
said driving unit further drives said sensor, in a first mode in which an interval from an end of the given second operation to a start of the next first operation is a first interval, so as to execute a third operation of making said first reset unit reset said detection element and making said second reset unit reset said holding unit in the interval, and
not to execute the third operation in a second mode in which in which an interval from an end of the given second operation to a start of the next first operation is a second interval shorter than the first interval.

* * * * *